(12) United States Patent
Menichino

(10) Patent No.: US 9,739,379 B2
(45) Date of Patent: Aug. 22, 2017

(54) HIGH MOISTURE ENVIRONMENT SEAL ASSEMBLY

(75) Inventor: Joseph A. Menichino, Andover, NY (US)

(73) Assignee: Dresser-Rand Company, Olean, NY (US)

( * ) Notice: Subject to any disclaimer, the term of this patent is extended or adjusted under 35 U.S.C. 154(b) by 0 days.

(21) Appl. No.: 13/450,952

(22) Filed: Apr. 19, 2012

(65) Prior Publication Data

US 2012/0267857 A1 Oct. 25, 2012

Related U.S. Application Data

(60) Provisional application No. 61/477,492, filed on Apr. 20, 2011.

(51) Int. Cl.
*F16J 15/16* (2006.01)
*F16J 15/34* (2006.01)

(52) U.S. Cl.
CPC .............. *F16J 15/164* (2013.01); *F16J 15/16* (2013.01); *F16J 15/34* (2013.01)

(58) Field of Classification Search
CPC .................................................... F16J 15/164
USPC .................. 277/348, 349, 370, 371, 399
See application file for complete search history.

(56) References Cited

U.S. PATENT DOCUMENTS

| | | | | |
|---|---|---|---|---|
| 3,656,824 A * | 4/1972 | Ullberg | | 384/482 |
| 3,667,767 A * | 6/1972 | Bakewell | | 77/348 |
| 3,703,296 A * | 11/1972 | Malmstrom | | 277/402 |
| 4,139,204 A * | 2/1979 | Howe | | 277/500 |
| 4,186,929 A * | 2/1980 | Burton et al. | | 277/346 |
| 4,348,067 A * | 9/1982 | Tooley | | 384/480 |
| 4,763,904 A * | 8/1988 | Martinie | | 277/348 |
| 4,817,846 A * | 4/1989 | Eichinger | | 277/370 |
| 4,875,786 A * | 10/1989 | DeWachter | | 384/482 |
| 4,928,979 A * | 5/1990 | Nagasawa | | 277/348 |
| 4,973,063 A * | 11/1990 | Korenblit | | 277/348 |
| 5,172,917 A * | 12/1992 | du Gay | | 277/402 |
| 5,259,628 A * | 11/1993 | Nisley | | 277/348 |
| 5,292,137 A * | 3/1994 | Simmons et al. | | 277/307 |
| 5,356,158 A * | 10/1994 | Simmons et al. | | 277/402 |
| 6,217,219 B1 * | 4/2001 | Hoeting | | 384/478 |
| 6,299,173 B1 * | 10/2001 | Lai | | 277/348 |
| 6,726,210 B2 * | 4/2004 | Lin | | 277/349 |
| 6,746,147 B2 * | 6/2004 | Blakley et al. | | 366/289 |
| 6,776,419 B2 * | 8/2004 | Antoun | | 277/500 |
| 6,783,129 B2 * | 8/2004 | Akita et al. | | 277/349 |
| 7,530,870 B2 * | 5/2009 | Kishimoto et al. | | 440/112 |
| 7,549,836 B2 * | 6/2009 | Anderson et al. | | 415/113 |
| 2004/0262845 A1* | 12/2004 | Matsui et al. | | 277/349 |
| 2007/0205561 A1* | 9/2007 | Emoto et al. | | 277/500 |

(Continued)

*Primary Examiner* — Eugene G Byrd

(57) ABSTRACT

A seal assembly is disclosed that can be used to seal a bearing case in a turbine. The seal assembly has an annular seal plate seated within a groove defined in the bearing case and radially-offset from the turbine shaft. A seal retainer is mounted on the shaft axially-offset from the annular seal plate and defines a channel therein for receiving and seating a seal therein. The seal has a flexible lip that extends from the body of the seal and engages either the inside surface of the bearing case or a counterface of the annular seal plate, thereby preventing or substantially restricting the influx of contaminants into the bearing case.

12 Claims, 4 Drawing Sheets

(56) References Cited

U.S. PATENT DOCUMENTS

2010/0156050 A1* 6/2010 Heinrich et al. .............. 277/346
2011/0023742 A1* 2/2011 Schaefer et al. .............. 102/464

* cited by examiner

HIGH MOISTURE ENVIRONMENT SEAL ASSEMBLY

This application claims priority to U.S. Patent Application Ser. No. 61/477,492, which was filed Apr. 20, 2011. The priority application is hereby incorporated by reference in its entirety into the present application.

BACKGROUND

The shaft of a typical steam turbine is supported for rotation by one or more bearings arranged within a bearing case. Typical bearings used for this purpose are oil-lubricated, journal bearings, which are protected from contamination via a bearing case seal, such as a labyrinth seal or brush seal. The presence of humidity and increased temperatures at the bearing case seal location allows moisture and other impurities to migrate through conventional bearing case seals and eventually accumulate inside the bearing case, thereby contaminating the bearing lubricating oil and oil reservoir. All steam turbines, even standby service units, are vulnerable to damage to or contamination of the bearing lubricating oil, which leads to a general degradation of the lubricating properties of the oil and can result in premature failure of the journal bearings.

In order to avoid premature failure of the bearings, turbine operators must frequently drain the bearing lubrication systems and replace the lubricating oil. How frequent such servicing is required depends on the operating steam conditions, the wear of the steam and oil seal components, and the severity of the moisture accumulation within the bearing case. Servicing the bearing lubrication system can be rather time-consuming and often requires the turbine to be put off line, thereby losing valuable operating time and costs.

What is needed, therefore, is a bearing case seal assembly that reduces or entirely restricts the influx of moisture and contaminants into the bearing case.

SUMMARY

Embodiments of the disclosure may provide a seal assembly for a bearing case. The seal assembly may include an annular seal plate seated within a groove defined in an inside surface of the bearing case, the annular seal plate being radially-offset from a rotatable shaft and extending circumferentially thereabout, and a seal retainer mounted on the rotatable shaft axially-offset from the annular seal plate, wherein the seal retainer is radially-offset from the inside surface of the bearing case. The seal assembly may further include a seal arranged axially-adjacent the seal retainer and extending circumferentially about the rotatable shaft, the seal having a body and a flexible lip extending from the body and engaging the inside surface of the bearing case.

Embodiments of the disclosure may further provide a method for sealing a bearing case. The method may include seating an annular seal plate at least partially within a groove defined in an inside surface of the bearing case, the annular seal plate being radially-offset from a rotatable shaft and extending circumferentially thereabout, and arranging a seal retainer on the rotatable shaft axially-offset from the annular seal plate and radially-offset from the inside surface of the bearing case. The method may also include seating a seal within a channel defined in the seal retainer, the seal having a body and a flexible lip extending from the body, and engaging the inside surface of the bearing case with the flexible lip.

Embodiments of the disclosure may further provide another seal assembly for a bearing case. The seal assembly may include an annular seal plate at least partially seated within a groove defined in an inside surface of the bearing case, the annular seal plate being radially-offset from a rotatable shaft to define a clearance therebetween, wherein the clearance is in fluid communication with an interior of the bearing case. The seal assembly may also include a seal retainer mounted on the rotatable shaft axially-offset from the annular seal plate and defining a channel therein, wherein the seal retainer is radially-offset from the inside surface of the bearing case to define a gap therebetween that is in fluid communication with an exterior environment. The seal assembly may further include a v-ring seal having a body and a flexible lip extending from the body, the body being seated within the channel and the flexible lip being configured to isolate the interior of the bearing case from the exterior environment.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
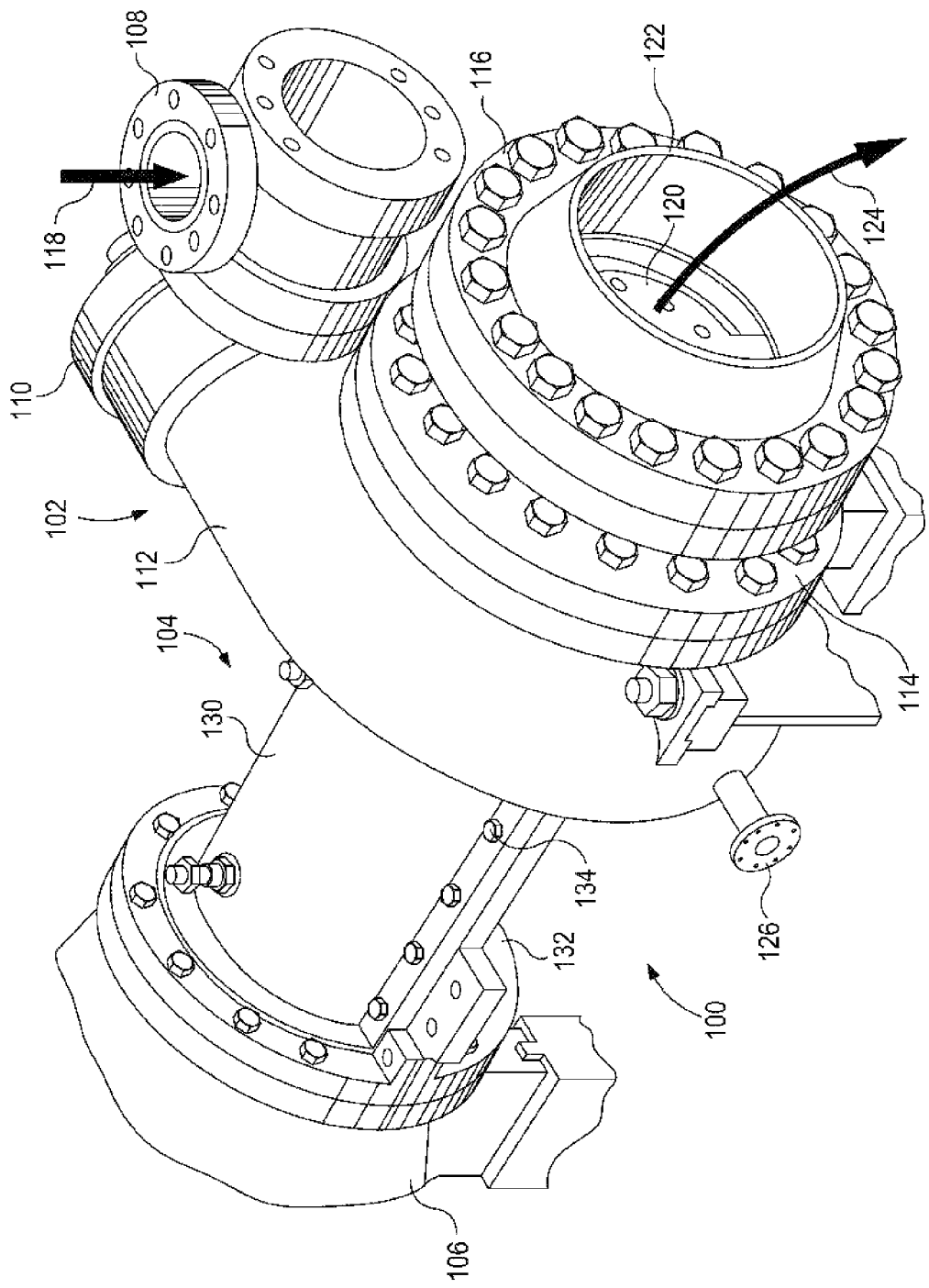
FIG. 1 illustrates a perspective view of a turbine in which an embodiment of the bearing case seal assembly of the present disclosure may be installed.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 2:
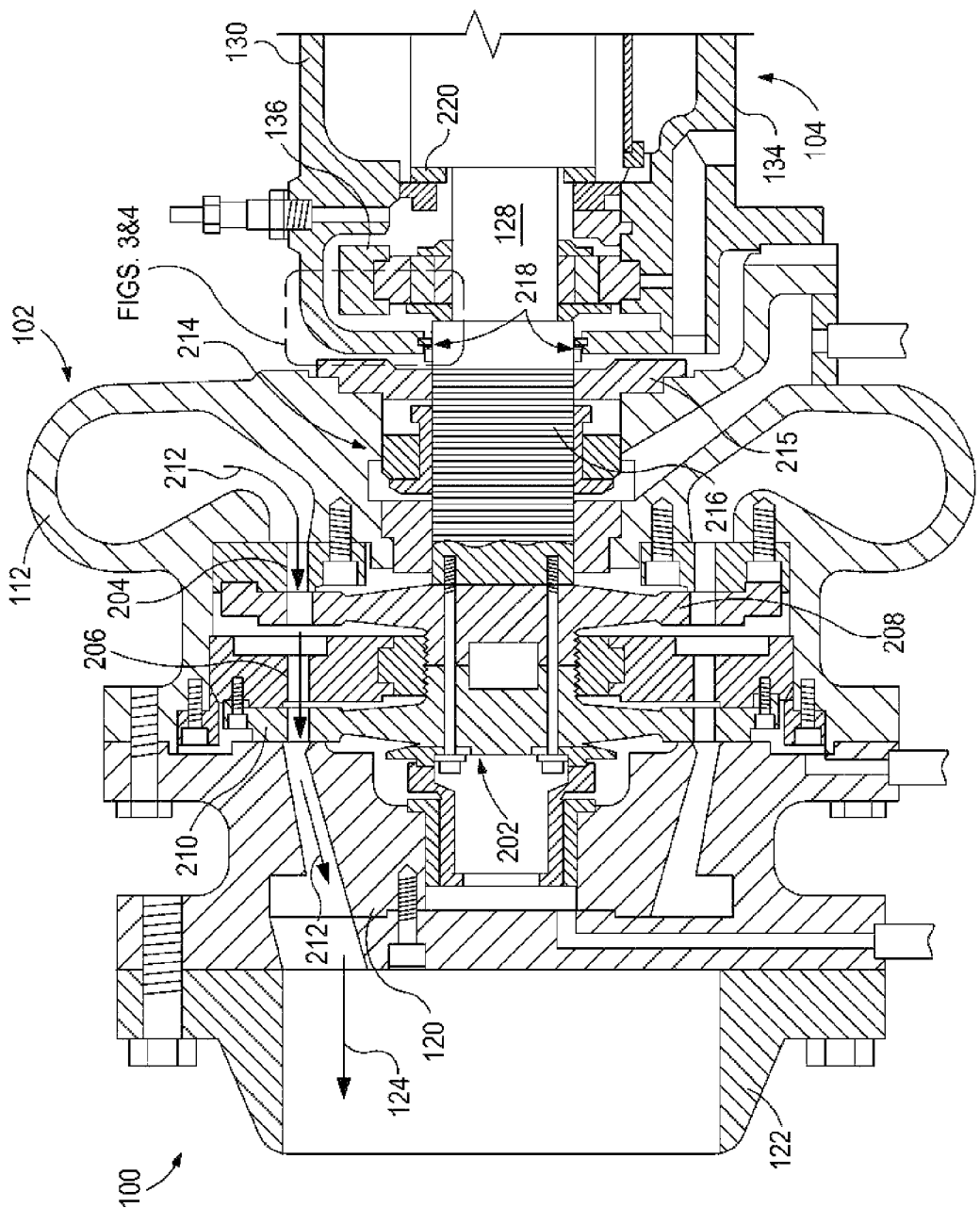
FIG. 2 illustrates a cross-sectional view of the turbine shown in FIG. 1.
Figure 3:
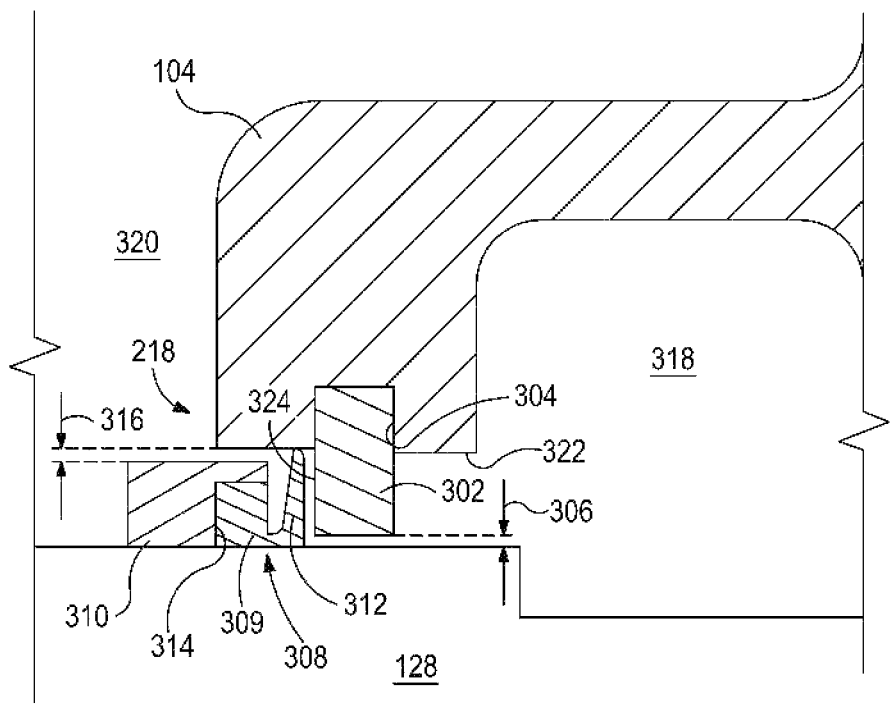
FIG. 3 illustrates a cross-sectional view of a seal assembly in a first configuration, according to one or more embodiments of the disclosure.
Figure 4:
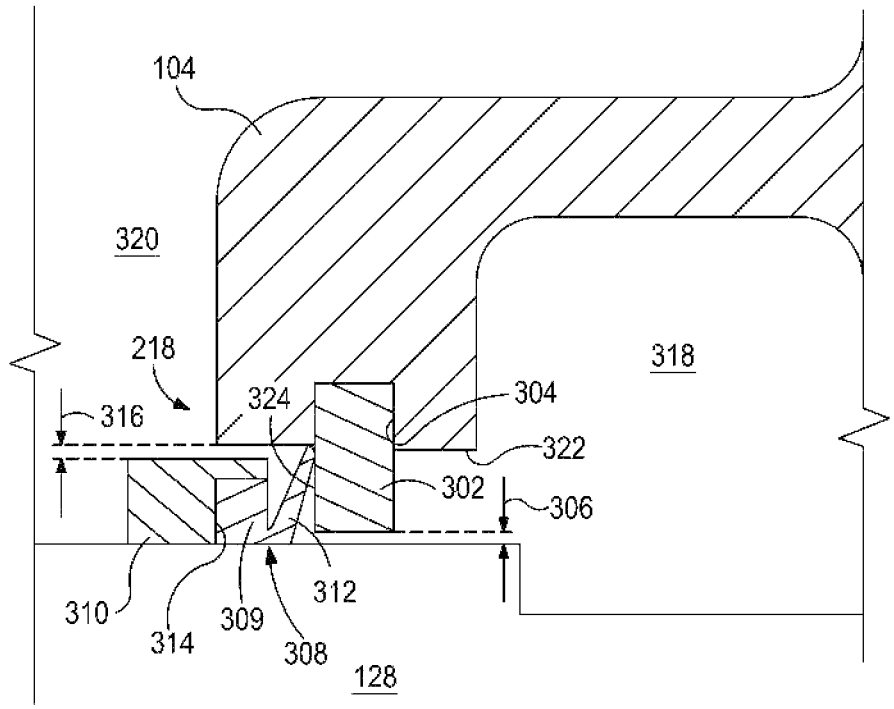
FIG. 4 illustrates a cross-sectional view of the seal assembly of FIG. 3 shown in a second configuration, according to one or more embodiments of the disclosure.

The disclosure generally relates to a seal assembly 218 as shown in FIGS. 2-4 and that may be used to seal a bearing case of a turbine, such as a steam turbine. Before describing the details of the seal assembly 218, however, an exemplary turbine will be described so that the unique aspects of the seal assembly 218 will be more readily appreciated. FIG. 1 illustrates an exemplary turbine 100 into which the seal assembly 218 may be installed and used. In particular, illustrated is an overhung steam turbine. Nevertheless it will be appreciated by those skilled in the art that the various embodiments of the seal assembly 218 as disclosed herein may be equally applied to other types and designs of turbines. For example, turbines having a shaft supported on each end by bearings may likewise employ the seal assembly 218, without departing from the scope of the disclosure.

The turbine 100 generally includes a turbine case 102, a bearing case 104, and a transmission case 106. The turbine case 102 includes a steam inlet 108 generally connected to a source of pressurized steam, a governor valve casing 110, an annular steam chest 112, a rotor casing 114, and a combined diffuser and exhaust outlet casing 116. In operation, the pressurized steam enters the inlet 108 in the direction indicated by arrow 118, passes through a governor valve (not shown) arranged within the governor valve casing 110, and into the steam chest 112. From the steam chest 112, the pressurized steam passes through the rotor casing 114 and exhaust steam exits through a diffuser 120 defined by the exhaust outlet casing 116 and an exhaust port 122 in the general direction indicated by arrow 124.

Casing drains and gland exhaust ports 126 may also be provided flanking the steam chest 112 on at least one side. The transmission case 106 may house or otherwise enclose a suitable reduction gear and other load bearing elements adapted for power generation and conversion.

In at least one embodiment, the bearing case 104 includes a horizontally-split housing formed of a first half casing 130 and a second half casing 132. The half casings 130, 132 may be coupled together along their respective flanged, contiguous sides by bolts 134 or similar mechanical attachment devices.

Referring now to FIG. 2, a partial cross-sectional view of the turbine 100 is illustrated. A rotor assembly 202 is arranged within the turbine 100, and more particularly within the turbine case 102 adjacent the annular steam chest 112. A rotor or shaft 128 extends through the bearing case 104 and ultimately into the transmission case 106 (FIG. 1). The rotor assembly 202 may include a plurality of rotor vanes or buckets 208, 210 axially-spaced from each other within the rotor casing 114. The plurality of rotor vanes or buckets 208, 210 may be configured to rotate past annular ports 204 and 206 defined within stators coupled to or otherwise formed within the steam chest 112. In operation, the pressurized steam courses through the steam chest 112, passing through the annular ports 204, 206 and rotor vanes 208, 210 in the direction indicated by arrows 212, and drives the rotor vanes 208, 210 creating rotational movement. The resultant exhaust passes through the annular diffuser 120 and exits out of the turbine 100 via the exhaust port 122.

Located upstream of the rotor vanes 208, 210 may be a shaft seal 214 configured to sealingly engage a section 216 of the shaft 128 arranged immediately forward or upstream of the turbine case 102 and within a packing case 215. The shaft 128 extends into the bearing case 104 through a seal assembly 218 associated with the bearing case 104, as will be described in more detail below. One or more bearings or bearing assemblies 136 may be arranged within the bearing case 104 to provide support for the shaft 128 as it rotates. In at least one embodiment, the bearings 136 may be oil film journal bearings, but in other embodiments could be any other suitable type of bearing. One or more thrust bearing assemblies 220 may also be arranged within the bearing case 104 and assist in minimizing axial movement of the shaft 128.

Referring now to FIGS. 3 and 4, illustrated is the bearing case seal zone generally depicted within the dashed box shown in FIG. 2, and an embodiment of the seal assembly 218, according to one or more embodiments disclosed. For purposes of clarity, the bearing 136 depicted within the bearing case seal zone in FIG. 2 is not shown in FIGS. 3 and 4. The seal assembly 218 may be configured to reduce or entirely prevent the encroachment of contaminants, such as moisture or other impurities, into the bearing case 104 which may adversely affect the bearings 136 and/or the lubricating oil used to lubricate the bearings 136.

The seal assembly 218 may include an annular seal plate 302 seated or otherwise received within a groove 304 defined in the bearing case 104. In at least one embodiment, the seal plate 302 may be made up of two or more arcuate sections that jointly encompass the entire circumference of the shaft 128. Otherwise, the seal plate 302 may be an unbroken annulus and fitted over the end of the shaft 128 and located near the groove 304 for installation. Once properly seated within the groove 304, the seal plate 302 may generally remain stationary during operation and radially-offset from the shaft 128 by a clearance 306 that allows free rotation of the shaft 128. The groove 304 may be an existing oil seal mount for the bearing case 104 configured to seat or otherwise receive a conventional bearing case seal or oil dam. Accordingly, in at least one embodiment, the seal assembly 218 may provide a valuable retrofit for existing turbines, where conventional bearing case seals and/or oil dams are partially or entirely replaced by the seal assembly 218. To this end, the groove 304 may include various shapes and sizes adapted to accommodate the connection points of varying shapes and sizes of conventional casing seals and oil dams. For example, the groove 304 may be dove-tailed or T-shaped, and the seal plate 302 may be formed to correspond to the varying shape of the groove 304.

The seal assembly 218 may also include a combination seal 308 and a seal retainer 310 arranged axially-adjacent the seal plate 302. Both the seal 308 and seal retainer 310 may be mounted directly on the shaft 128 and configured for rotation therewith. In one embodiment, the seal 308 may be an elastomeric, v-ring seal having a flexible lip 312 extending from a body 309 of the seal 308. Since the seal 308 may be elastic, it can be stretched over flanges or other assemblies for appropriate positioning on the shaft 128 with relatively little unit disassembly. The seal retainer 310 may be coupled to the shaft 128 in a variety of ways, such as, but not limited to, mechanical fasteners (such as a set screw), welding, heat shrinking the seal retainer 310 to the shaft 128, or seating the seal retainer 310 within its own retainer structure (not shown). The seal retainer 310 may define a channel 314 configured to seat or otherwise receive the body 309 of the seal 308 such that the relative position of the seal 308 may be fixed in both the radial and axial directions. In order to allow free rotation of the shaft 128, the seal retainer 310 may be radially-offset from the bearing case 104, thereby forming a gap or clearance 316 there between.

In operation, the seal assembly 218 may be configured to completely close or at least significantly isolate the interior 318 of the bearing case 104 from the high-moisture, high-humidity external environment 320. For example, FIG. 3 depicts the seal assembly 218 in a first configuration when the turbine 100 (FIGS. 1 and 2) is either at rest or at a low rotational speed. In this configuration, the flexible lip 312 extends and makes contact with the inside surface 322 of the bearing case 104. Consequently, moisture and other impurities are prevented or at least substantially restricted from migrating through the seal assembly 218 from the external environment 320 to the interior 318 of the bearing case 104. At slow rotation speeds, the flexible lip 312 may be in sliding engagement with the inside surface 322 of the bearing case 104 and simultaneously prevent the influx of contaminants past the seal assembly 118. It will be appreciated, however, that the flexible lip 312 may also be designed or otherwise adapted to engage the seal plate 302 when the turbine 100 is at rest or at slow rotational speeds.

FIG. 4 depicts the seal assembly 218 in a second configuration, for example, when the turbine 100 is operating at intermediate rotational speeds. In this configuration, the flexible lip 312 may be forced into sliding engagement with at least a counterface 324 of the seal plate 302, but may also maintain sealing engagement with the inside surface 322 of the bearing case 104. As the change in pressure across the seal assembly 218 increases, and moisture and other impurities attempt to migrate into the lower-pressure bearing case interior 318 via the clearance 316 with greater force, the sealing effect of the flexible lip 312 against at least the counterface 324 is also increased. Forcing the flexible lip 312 into sliding engagement with the counterface 324 creates a stronger seal that is more capable of restricting or entirely eliminating the influx of contaminants via the clearance 316. At high rotational speeds, the pressure differential experienced across the seal 308 may lift or otherwise force the seal 308 out of engagement with the seal plate 302 and the inside surface 322 of the bearing case 104, thereby converting the seal 308 from a full contact-type seal into a highly effective labyrinth-type seal.

Figure 5:
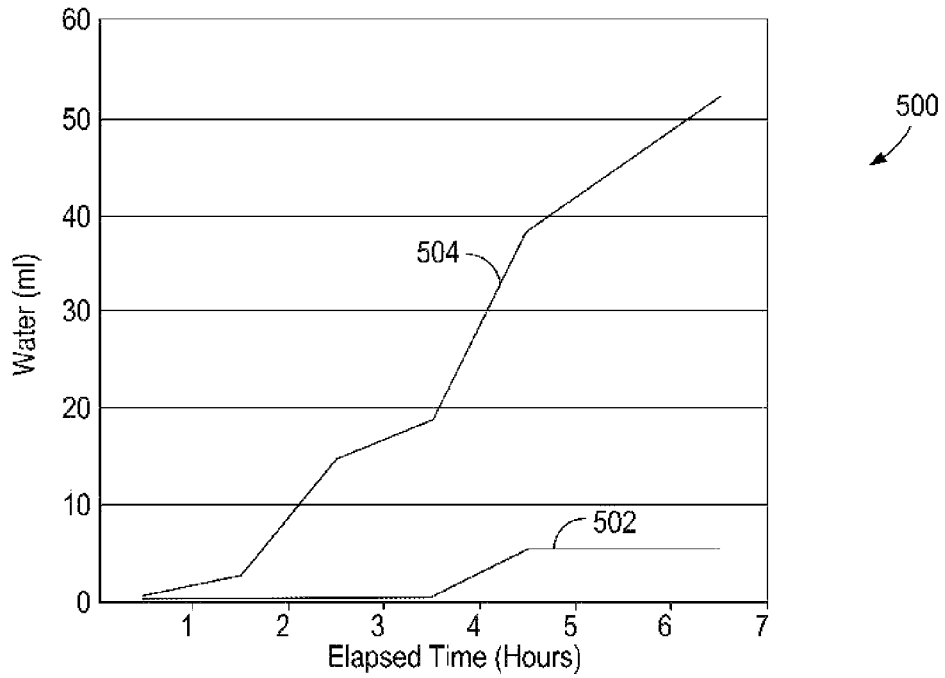
FIG. 5 illustrates a line chart comparing the performance of the exemplary seal assembly described herein with a conventional bearing case seal and/or oil dam.

Referring now to FIG. 5, illustrated is a chart 500 depicting the performance of embodiment of the seal assembly 218, as described herein, as compared with a conventional bearing case seal and/or oil dam. Specifically, the chart 500 depicts moisture accumulation in the bearing case 104 as measured in milliliters (ml) and as reported over elapsed hourly time. The readings for moisture accumulation were derived from observing the lubricating oil reservoir that feeds lubricating oil to the bearings 136. Testing of the seal assembly 218 was undertaken over a wide range of speeds and operating temperatures. In at least one test scenario, the operating temperature was around 500° F. with a shaft 108 speed of about 4500 rpm. It was found that the seal assembly 218 may properly operate at temperatures at or about 400° F. and shaft 108 speeds at or about 6000 rpm. It will be appreciated, however, that operating temperatures and speeds may be able to increase depending on the application, for example, applications using different component materials designed to withstand higher temperatures and speeds.

The first line 502 in the chart 500 is indicative of the performance of the seal assembly 218, as generally described herein, and the second line 504 indicates the performance of a conventional seal or oil dam. As illustrated, the first line 502 conveys a moisture accumulation that is significantly lower than the second line 504. For example, at the end of approximately six hours of elapsed operating time, the first line 502 reports an accumulation of about 5 ml using the seal assembly 218, while the second line 504 reports an accumulation of about 50 ml using a conventional seal or oil dam.

Figure 6:
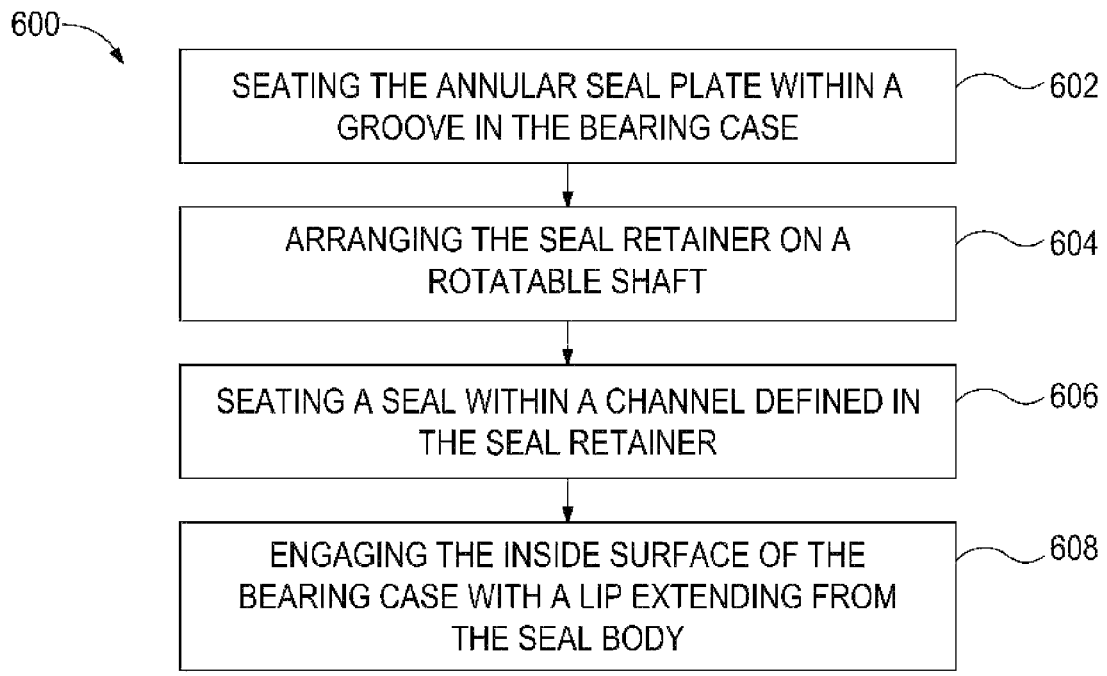
FIG. 6 illustrates a schematic flowchart of a method of sealing a bearing case, according to one or more embodiments disclosed.

Referring now to FIG. 6, illustrated is a schematic flowchart of a method 600 for sealing a bearing case. The method 600 may include seating the annular seal plate within the groove defined in the inside surface of the bearing case, as at 602. As described above, the groove can be machined or otherwise formed to accommodate different sizes and shapes (e.g., dove-tail or T-shaped) of the annular seal plate. Once seated, the annular seal plate may be radially-offset from the rotatable shaft and extend circumferentially thereabout. The seal retainer may then be arranged on the rotatable shaft, as at 604. The seal retainer may be axially-offset from the annular seal plate and radially-offset from the inside surface of the bearing case.

A seal may be seated within a channel defined in the seal retainer, as at 606. The seal may include a body and a flexible lip extending from the body. The method 600 may further include engaging the inside surface of the bearing case with the flexible lip, as at 608. As the rotatable shaft rotates, the flexible lip may slidingly engage (e.g., is capable of sliding as it engages) the inside surface of the bearing case, but may also simultaneously slidingly engage a counterface of the annular seal ring, thereby isolating an interior of the bearing case from an exterior environment and restricting or otherwise preventing the influx of contaminants into the interior of the bearing case.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A seal assembly for a bearing case of a turbine, comprising:
    an annular seal plate seated within a groove defined in an inside surface of the bearing case, the annular seal plate being radially-offset from a rotatable shaft and extending circumferentially thereabout;
    a seal retainer directly mounted on and fixedly attached to the rotatable shaft axially-offset from the annular seal plate, wherein the seal retainer is radially-offset from the inside surface of the bearing case; and
    a seal arranged axially-adjacent the seal retainer and extending circumferentially about the rotatable shaft, the seal having a body mounted directly on the rotatable shaft and a flexible lip extending from the body, wherein:
        the flexible lip is configured to engage the inside surface of the bearing case when the turbine is at rest,
        the flexible lip is configured to engage an annular surface of the annular seal plate while maintaining engagement with the inside surface of the bearing case when the turbine is operated at an intermediate rotational speed, and
        the flexible lip is configured to disengage from the inside surface of the bearing case and the annular surface of the annular seal plate when the turbine is operated at a high rotational speed.

2. The seal assembly of claim 1, wherein the seal is an elastomeric v-ring seal.

3. The seal assembly of claim 1, wherein the seal is configured to isolate an interior of the bearing case from an exterior environment.

4. The seal assembly of claim 1, wherein the seal retainer is directly mounted on and fixedly attached to the rotatable shaft by a mechanical fastener, heat shrinking, or welding.

5. The seal assembly of claim 1, wherein the seal retainer holds the seal in place in both radial and axial directions.

6. The seal assembly of claim 1, wherein the bearing case houses bearings for a turbine.

7. The seal assembly of claim 6, wherein the turbine is an overhung turbine.

8. A method for sealing a bearing case of a turbine, comprising:
    seating an annular seal plate at least partially within a groove defined in an inside surface of the bearing case, the annular seal plate being radially-offset from a rotatable shaft and extending circumferentially thereabout;
    fixedly attaching a seal retainer directly to the rotatable shaft axially-offset from the annular seal plate and radially-offset from the inside surface of the bearing case;
    seating a seal within a channel defined in the seal retainer, the seal having a body mounted directly on the rotatable shaft and a flexible lip extending from the body;
    engaging the flexible lip with the inside surface of the bearing case when the turbine is at rest;
    engaging the flexible lip with an annular surface of the annular seal plate while maintaining engagement of the flexible lip with the inside surface of the bearing case when the turbine is operated at an intermediate rotational speed; and
    disengaging the flexible lip from the inside surface of the bearing case and the annular surface of the annular seal plate when the turbine is operated at a high rotational speed.

9. The method of claim 8, further comprising isolating an interior of the bearing case from an exterior environment.

10. The method of claim 8, further comprising holding the seal in place in both radial and axial directions with the seal retainer.

11. A seal assembly for a bearing case of a turbine, comprising:
    an annular seal plate at least partially seated within a groove defined in an inside surface of the bearing case, the annular seal plate being radially-offset from a rotatable shaft to define a clearance therebetween, wherein the clearance is in fluid communication with an interior of the bearing case;
    a seal retainer directly mounted on and fixedly attached to the rotatable shaft axially-offset from the annular seal plate and defining a channel therein, wherein the seal retainer is radially-offset from the inside surface of the bearing case to define a gap therebetween that is in fluid communication with an exterior environment; and
    a v-ring seal having a body mounted directly on the rotatable shaft and a flexible lip extending from the body, wherein:
        the body is seated within the channel,
        the flexible lip is configured to engage the inside surface of the bearing case when the turbine is at rest,
        the flexible lip is configured to engage the annular seal plate while maintaining engagement with the inside surface of the bearing case when the turbine is operated at a first rotational speed, and
        the flexible lip is configured to disengage from the inside surface of the bearing case and the annular seal plate when the turbine is operated at a second rotational speed relatively faster than the first rotational speed.

12. The seal assembly of claim 11, wherein the v-ring seal is elastomeric.

* * * * *